United States Patent
Trifonov et al.

(10) Patent No.: US 10,361,563 B2
(45) Date of Patent: Jul. 23, 2019

(54) SMART POWER AND STORAGE TRANSFER ARCHITECTURE

(71) Applicant: International Power Supply AD, Sofia (BG)

(72) Inventors: Stoil Rangelov Trifonov, Sofia (BG); Filip Stoilov Rangelov, Sofia (BG); Alexander Stoilov Rangelov, Sofia (BG)

(73) Assignee: INTERNATIONAL POWER SUPPLY AD, Sofia (BG)

( * ) Notice: Subject to any disclaimer, the term of this patent is extended or adjusted under 35 U.S.C. 154(b) by 267 days.

(21) Appl. No.: 15/385,627

(22) Filed: Dec. 20, 2016

(65) Prior Publication Data

US 2018/0175624 A1 Jun. 21, 2018

(51) Int. Cl.
*H02J 3/32* (2006.01)
*H02J 3/38* (2006.01)
(Continued)

(52) U.S. Cl.
CPC ............... *H02J 3/382* (2013.01); *H02J 3/32* (2013.01); *H02J 3/383* (2013.01); *H02J 3/386* (2013.01);
(Continued)

(58) Field of Classification Search
CPC .......... H02J 3/382; H02J 13/0006; H02J 3/32; H02J 3/383; H02J 3/386; H02J 7/007;
(Continued)

(56) References Cited

U.S. PATENT DOCUMENTS

| 5,736,933 A | 4/1998 | Segal |
| 6,047,222 A | 4/2000 | Burns et al. |

(Continued)

FOREIGN PATENT DOCUMENTS

| EP | 2081273 A2 | 7/2009 |
| EP | 2658027 A1 | 10/2013 |
| WO | WO 2014/057304 A1 | 4/2014 |

OTHER PUBLICATIONS

Wikipedia contributors. "Electrical telegraph." Wikipedia, The Free Encyclopedia. Wikipedia, The Free Encyclopedia, Feb. 11, 2019. Web. Feb. 17, 2019. (Year: 2019).*

(Continued)

*Primary Examiner* — Daniel J Cavallari
(74) *Attorney, Agent, or Firm* — Sterne, Kessler, Goldstein & Fox P.L.L.C.

(57) ABSTRACT

A system and method for a distributed smart power and storage transfer architecture. An embodiment includes a stored power transfer control system comprising a remote monitoring processor located remotely from a plurality of sites, wherein the plurality of sites are connected to a distribution line. The stored power transfer control system further includes a plurality of energy storage systems distributed across the plurality of sites and a plurality of power control modules distributed across a plurality of sites. At least one of the plurality of power control modules is configured to receive, by a first communication bus, a data telegram from a monitoring processor and forward, by the first communication bus, the data telegram to a connected power control module. Further the at least one of the plurality of power control modules is configured to supply the distribution line with power output by a respective energy storage system according to the data telegram.

14 Claims, 10 Drawing Sheets

(51) Int. Cl.
*H02J 7/00* (2006.01)
*H02M 7/04* (2006.01)
*H02M 7/44* (2006.01)
*H02J 13/00* (2006.01)

(52) U.S. Cl.
CPC ............ *H02J 7/007* (2013.01); *H02J 7/0068* (2013.01); *H02J 13/0006* (2013.01); *H02M 7/04* (2013.01); *H02M 7/44* (2013.01); *Y02E 60/722* (2013.01); *Y04S 10/14* (2013.01)

(58) Field of Classification Search
CPC .......... H02J 7/0068; H02M 7/44; H02M 7/04; Y04S 10/14; Y02E 60/722
See application file for complete search history.

(56) References Cited

U.S. PATENT DOCUMENTS

| | | | |
|---|---|---|---|
| 6,252,881 | B1 | 6/2001 | Samoylenko |
| 6,747,959 | B1 | 6/2004 | Ho |
| 8,666,560 | B2 | 3/2014 | Lu et al. |
| 9,281,689 | B2 | 3/2016 | Boardman et al. |
| 9,622,256 | B2 | 4/2017 | Zhao et al. |
| 2005/0034023 | A1 | 2/2005 | Maturana et al. |
| 2006/0229738 | A1 | 10/2006 | Bhandiwad et al. |
| 2010/0165923 | A1 | 7/2010 | Tseng et al. |
| 2011/0082598 | A1 | 4/2011 | Boretto et al. |
| 2012/0065802 | A1 | 3/2012 | Seeber et al. |
| 2012/0131217 | A1 | 5/2012 | Delorme et al. |
| 2012/0271576 | A1 | 10/2012 | Kamel et al. |
| 2012/0323382 | A1 | 12/2012 | Kamel et al. |
| 2012/0324273 | A1 | 12/2012 | Shaffer et al. |
| 2013/0016612 | A1 | 1/2013 | Vasseur et al. |
| 2013/0041516 | A1 | 2/2013 | Rockenfeller et al. |
| 2014/0039702 | A1 | 2/2014 | Ilic et al. |
| 2014/0153383 | A1 | 6/2014 | Mabilleau et al. |
| 2014/0177477 | A1 | 6/2014 | Cachin et al. |
| 2014/0236318 | A1 | 8/2014 | Esposito et al. |
| 2014/0249688 | A1 | 9/2014 | Ansari et al. |
| 2014/0277788 | A1 | 9/2014 | Forbes |
| 2014/0307553 | A1 | 10/2014 | Fung |
| 2014/0325255 | A1 | 10/2014 | Jensen |
| 2015/0207645 | A1 | 7/2015 | Kanabar et al. |
| 2015/0346753 | A1 | 12/2015 | Gan et al. |
| 2015/0370278 | A1 | 12/2015 | Li et al. |
| 2016/0021018 | A1 | 1/2016 | Hui et al. |
| 2016/0043552 | A1 | 2/2016 | Villanueva et al. |
| 2016/0064935 | A1 | 3/2016 | Gao et al. |
| 2016/0186728 | A1 | 6/2016 | Mazur |
| 2016/0248255 | A1 | 8/2016 | Rive et al. |
| 2016/0309352 | A1 | 10/2016 | Yuan et al. |
| 2016/0344188 | A1* | 11/2016 | Carlson ................ G05B 15/02 |
| 2017/0005473 | A1 | 1/2017 | Somani et al. |
| 2017/0063093 | A1 | 3/2017 | Wang et al. |
| 2017/0090467 | A1 | 3/2017 | Cincea et al. |
| 2017/0102726 | A1 | 4/2017 | Goldsmith |
| 2017/0153633 | A1 | 6/2017 | Christiansen et al. |

OTHER PUBLICATIONS

Telegram. In Merriam-Webster's collegiate dictionary. Retrieved from https://www.merriam-webster.com/dictionary/telegram. (Year: 2019).*

International Search Report and Written Opinion directed to International Patent Application No. PCT/IB2017/051369, dated May 16, 2017; 13 pages.

Gaushell et al., "SCADA communication techniques and standards," IEEE Computer Applications in Power 6.3 (1993); 45-50.

Kalapatapu, "SCADA protocols and communication trends," ISA2004 (2004).

Marihart, "Communications technology guid3elines for EMS/SCADA systems," IEEE Transactions on Power Delivery 16.2 (2001); 181-188.

Tib, "04-1: National Communications, Technical Information Bulletin 04-1 Supervisory Control and Data Acquistion (SCADA) Systems, Oct. 2004," Office of the Manager, National Communications System, PO box 4052: 22024-4052.

International Search Report and Written Opinion of the International Searching Authority directed to International Patent Application No. PCT/IB2017/058144, dated Feb. 12, 2018; 16 pages.

* cited by examiner

US 10,361,563 B2

SMART POWER AND STORAGE TRANSFER ARCHITECTURE

BACKGROUND

With a rise in the reliance on renewable energy, new challenges arise in storing energy at off-grid facilities. Such challenges include the conversion of stored energy, the distribution of stored energy, and supplying stored energy to multiple sites. Today, off-grid energy storage systems allow multiple sites to store renewable energy locally. These systems allow off-grid facilities to rely on renewable energy sources when available and allow for the use of locally stored energy when needed. Further, off-grid storage systems may transfer the stored energy at one site to another site as DC power.

However, delivering the stored energy from one site to another site as DC power results in a noticeable loss of efficiency. Due to this, a large amount of the energy stored at one site will be lost when it is transferred as DC power to another site. Additionally, when an off-grid energy storage system malfunctions, the energy stored can no longer be delivered to another site until the system has been repaired. This leaves a site without access to the stored energy until repairs have been made to the system.

SUMMARY

Provided herein are system, apparatus, article of manufacture, method and/or computer program product embodiments, and/or combinations and sub-combinations thereof, for a distributed smart power and storage transfer architecture.

An embodiment includes a stored power transfer control system. The stored power transfer control system may include a distribution line connected to a plurality of sites. Further, the system may include a remote monitoring processor located remotely from the plurality of sites, a plurality of energy storage systems distributed across the plurality of sites, and a plurality of power control modules distributed across a plurality of sites. At least one of the plurality of power control modules may be configured to: receive, by a first communication bus, a data telegram from a monitoring processor; forward, by the first communication bus, the data telegram to a connected power control module; and supply the distribution line with power output by a respective energy storage system according to the data telegram.

Another embodiment includes a system in a distributed stored power transfer control system that may include a memory located at a site and at least one processor located at the site coupled to the memory. The at least one process may be configured to receive, by a first communication path, a data telegram from a second site, wherein the data telegram comprises a desired power output for an energy storage system located at the site. Further, the at least one processor may supply a power output of the energy storage system to a distribution line according to the data telegram, report, by a second communication path, an update of the energy storage system to the second site, and send, by the first communication path, the data telegram to a third site.

A further embodiment includes a method in a distributed energy storage system comprising a controller and a plurality of energy storages distributed across a plurality of sites. The method may include generating a data telegram, wherein the data telegram comprises a plurality of blocks. Further, the method may include sending, by a first communication path of the controller, the data telegram to a site of the plurality of sites, wherein a power control module located at the site is configured to update power characteristics of power output of an energy storage of the plurality of energy storages located at the site according to at least one block of the data telegram. The method may further include receiving, by a second communication path, an update from the power control module located at the site.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

The drawings are representative of embodiments of the invention. In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for exporting analytic data.

Figure 1:
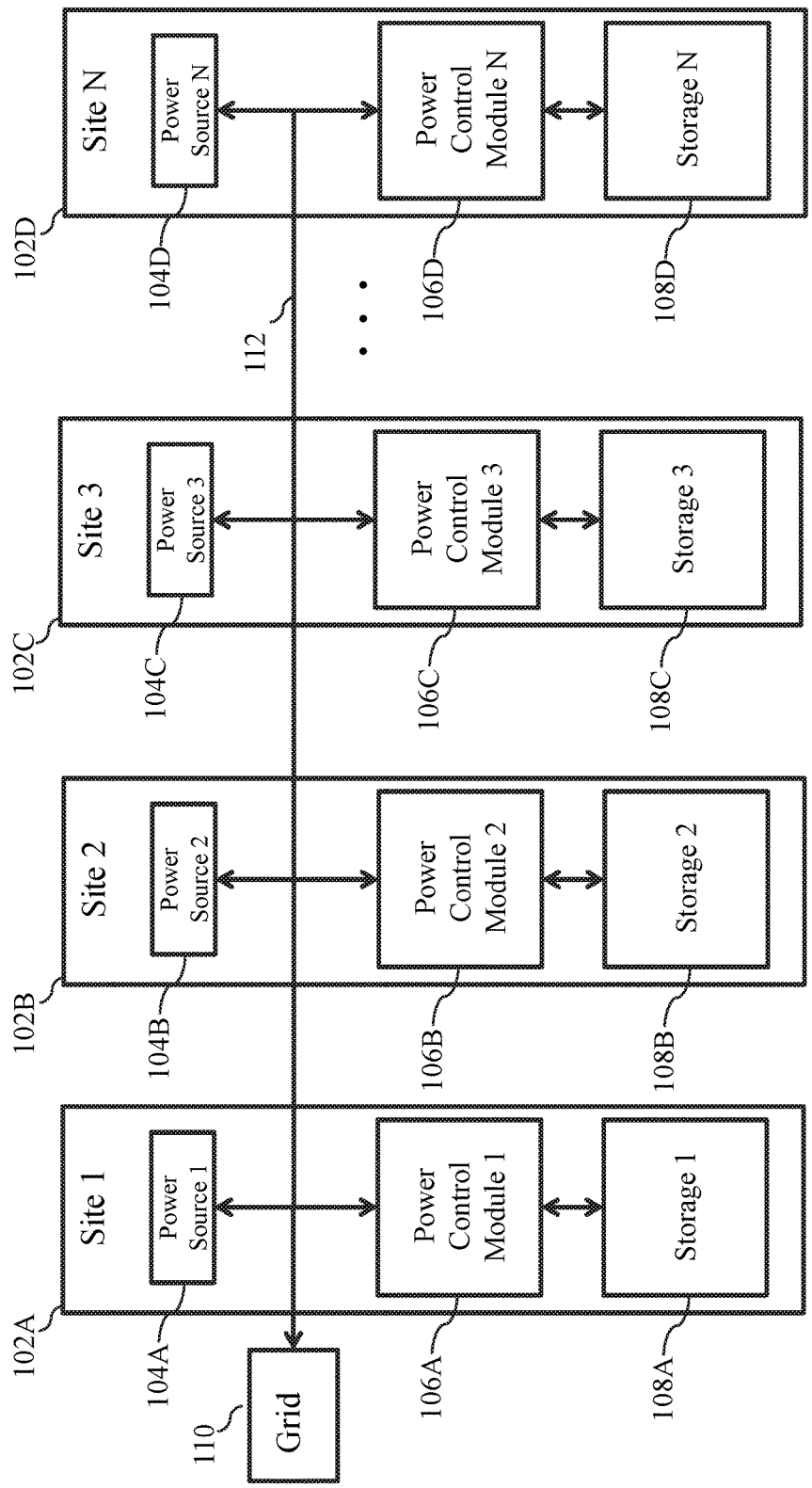
FIG. 1 is a diagram illustrating an example of a smart power and storage transfer architecture 100 between one through N sites, according to an embodiment.

FIG. 1 is a diagram illustrating an example of a distributed smart power and storage transfer architecture 100 between one through N sites, according to an embodiment. Smart power and storage transfer architecture 100 may comprise a plurality of sites 102 (comprising site 1 102A, site 2 102B, site 3 102C, and site N 102D), a plurality of power generation sources 104 (comprising power generation source 1 104A, power generation source 2 104B, power generation source 3 104C, and power generation source N 104D) distributed among the sites 102, a plurality of power control modules (comprising power control module 1 106A, power control module 2 106B, power control module 3 106C, and power control module N 106D) distributed among the sites 102, a plurality of energy storages 108 (comprising storage 1 108A, storage 2 108B, storage 3 108C, and storage N 108D) distributed among the sites 102, grid 110, and distribution line 112.

In an embodiment, sites 102 may be located at a plurality of distances away from one another. For example, site 1 102A may be located at a distance X from site 2 102B, and site 2 may be located at a distance Y from site 3 102C. According to an embodiment, the distance between the locations of sites 102 may be from feet to miles.

According to an embodiment, each site of sites 102 may comprise a plurality of loads. These plurality of loads, located among sites 102, may comprise a plurality of load types. The plurality of load types may comprise types of loads found at different locations, such as load types found at oil pipelines, telecommunication stations, residential homes, oil rigs, cities, offices, factories, military facilities, or any combination thereof. Each of the load types may have different desired power characteristics for the loads of that type to operate. Such desired power characteristics may comprise desired frequencies, voltages, currents, amplitudes, or any combination thereof.

According to an embodiment, each of sites 102 are connected by distribution line 112. Distribution line 112 may comprise any type of power line that supports AC power distribution. Such as low voltage (LV), medium voltage (MV), high voltage (HV), extra high voltage (EHV) transmission lines, or any combination thereof—to name a few examples. In an embodiment, distribution line 112 may be connected to the plurality of loads at each site of sites 102.

In an embodiment, each site of sites 102 may comprise a plurality of sensors that monitor the plurality of loads at each respective site. The plurality of sensors may comprise a plurality of sensor types such as visual sensors, environmental sensors, proximity sensors, movement sensors, or any combination thereof—to name a few examples. For example, site 1 102A may comprise a sensor that monitors the plurality of loads located at site 1 102A. According to an embodiment, the sensors located at a site may monitor the status, current, voltage, usage, location, or any combination thereof, of loads located at the same site.

According to an embodiment, each site of sites 102 may comprise a plurality of sensors that monitor the environment of each respective site. The plurality of sensors may comprise a plurality of sensor types such light sensors, heat sensors, solar irradiation sensors, humidity sensors, wind speed sensor, or any combination thereof—to name a few examples. For example, site 1 102A may comprise a sensor that monitors the environment of site 1 102A. According to an embodiment, the sensors located at a site may monitor the temperature, humidity, solar irradiation, wind speed, precipitation, location, or any combination thereof, of the environment of the site.

In an embodiment, a power generation source, a power control module, and an energy storage may be located at each site. For example, power generation source 1 104A, power control module 1 106A, and storage 1 108A may be located at site 1 102A. According to an embodiment, power generations sources 104 may comprise a plurality of power generation source types such as photovoltaic solar panels, wind turbines, diesel generators, hydroelectric sources, or any combination thereof—to name a few examples.

According to an embodiment, power characteristics of the power generated by power generation sources 104 may be dependent on environmental conditions. The power characteristics may comprise the frequency, voltage, current, amplitude, or any combination thereof, of the power generated. The environmental conditions may comprise solar irradiance, temperature of the environment, temperature of the power generation source, mass of the air, or any combination thereof—to name a few. For example, power generation sources 104 may comprise a photovoltaic solar panel which outputs power at a voltage that is dependent upon solar irradiance (i.e., the voltage of the power generated by the solar panel changes as the solar irradiance changes).

According to an embodiment, the power generation source located at a site may generate power. In an embodiment, the power generated from the power generation source located at a site may be fed to a power control module located at the same site. For example, the power generated from power source 1 104A located at site 1 102A, may be fed to power control unit 1 106A also located at site 1 102A.

In an embodiment, power control modules 106 may comprise power control systems for converting and controlling the flow of power across the sites. These power control systems may comprise power controllers, inverters, rectifiers, convertors, charge controllers, hybrid power control systems—or any combination thereof, to name a few. According to an embodiment, a power control module located at a site may control the characteristics of the power generated by the power generation source located at the same site. The power controller may control these power characteristics through adjusting loads attached to the power generation source, pulse width modulation (PWM), multipoint power tracking, automatic gain control (AGC), or any combination thereof—to name a few examples.

In another embodiment, a power control module may maintain desired characteristics of power generated by power sources 104 wherein the power generated is dependent on environmental conditions. The power control module may maintain desired characteristics of the power generated through the use of PWM or multipoint power tracking, to name a couple of examples. For example, power generation source 1 104A located at site 1 102A may comprise a photovoltaic solar panel that generates power at a voltage that may change based on solar irradiance. Power control module 1 106A also located at site 1 102A may be configured to maintain a desired voltage for the power generated by the photovoltaic solar panel through the use of PWM or multipoint power tracking.

In an embodiment, power control modules 106 may receive a data telegram. The data telegram may comprise desired power characteristics and a desired power flow for the power received from a power generation source. For example, power control module 1 106A may receive a data telegram comprising the desired current for the power received from power generation source 104A and a command to feed the power received from power generation source 1 104A to storage 1 108A.

According to an embodiment, a power control module at a site may feed received power from a power generation source to an energy storage. For example, power control module 1 106A, located at site 1 102A, may feed power received from power generation source 1 104A to storage 1

108A, also located at site 1 102A. In an embodiment, energy storages 108 may comprise a plurality of power storage types such as batteries, flywheels, capacitors, deep-cycle batteries, or any combination thereof—to name a few. Each of the power storage types may have different power requirements to allow the power storage types to store energy. Such power requirements may comprise desired frequencies, voltages, currents, amplitudes, or any combination thereof.

In an embodiment, power output from an energy storage located a site may be fed to a power control module located at the same site. For example, power from storage 1 108A located at site 1 102A may be fed into power control module 1 106A also located at site 1 102A. According to an embodiment, each power control module of power control modules 106 may feed power output by its respective energy storage to distribution line 112. For example, power generation source 106A, located at site 1 102A, may feed power output from storage 1 108A, also located at site 1 102A, to distribution line 112.

According to an embodiment, power control modules 106 may control the power characteristics and flow of the power output by their respective energy storages. Controlling the power characteristics of the power from an energy storage may comprise converting the power, rectifying the power, inverting the power, or any combination thereof—to name a few examples. For example, power control module 1 106A may convert power output by storage 102A to, for example, AC power at 60 Hz, and feed the converted power to distribution line 112.

In an embodiment, each power control module of power control modules 106 may be connected to a microcontroller unit (MCU). The MCU may comprise a computer, a mobile device, a processor, a microprocessor, a microcontroller, a server—or any combination thereof—to name a few examples. According to an embodiment, each power control module located at a site may send respective sensor information from the same site the MCU, as detailed in FIG. 6. In an embodiment, the MCU may analyze and store the received information and send a data telegram for adaptive power to power control module 106 based upon the analysis, as discussed in FIG. 7.

According to an embodiment, power control modules 106 may receive a data telegram comprising desired power characteristics and a desired power flow for the power output by an energy storage. For example, power control module 1 106A may receive a data telegram comprising a desired AC current for the power output by storage 1 108A and a command to feed the power output from storage 1 108A to distribution line 112.

In an embodiment, power control modules 106 may be synchronized to provide AC power from energy storages 108 to distribution line 112. Synchronization may comprise converting DC power output from an energy storage to AC power at the same frequency for all power control modules 106. For example, power controls modules 106 may be synchronized so that each power control module converts the power output by its respective energy storage to AC power at, for example, 60 Hz before the power is fed to distribution line 112.

In an embodiment, synchronization of each power control module of power control modules 106 may be controlled by a synchro signal. The synchro signal may comprise data instructing each power control module to output AC power at a specific frequency. According to an embodiment, each power control module may send or receive a synchro signal from a synchro line as detailed in FIG. 5.

According to an embodiment, power control modules 106 may control the power characteristics and flow of the power from distribution line 112 to the plurality of loads at each site of sites 102. For example, power control module 1 106A may control the power characteristics and flow of power from distribution line 112 to a plurality of loads located at site 1 102A. As an example, power control module 1 106A may convert AC power output by distribution line 112 to AC power and feed the converted power to the plurality of loads located at site 1 102A.

According to an embodiment, power from energy storages 108 may be back-fed to grid 110. Grid 110 may comprise a radial distribution grid, network distribution grid, smartgrid system, or any combination thereof—to name a few examples. For example, power control module 1 106A may receive power supplied from storage 1 108A as DC power. Power control module 1 106A may invert the power supplied from storage 1 108A to AC power and backfeed the power into grid 110.

In an embodiment, power control modules 106 may control the power characteristic and flow of power from grid 110. Power from grid 110 may comprise AC power, DC power, wireless power, radio frequency (RF) power, ultrasound power, wired power, or any combination thereof—to name a few examples. For example, grid 110 may supply radio frequency power to power control module 1 106A. Power control module 1 106 may rectify the received RF power and supply it to storage 1 108A.

Figure 2:
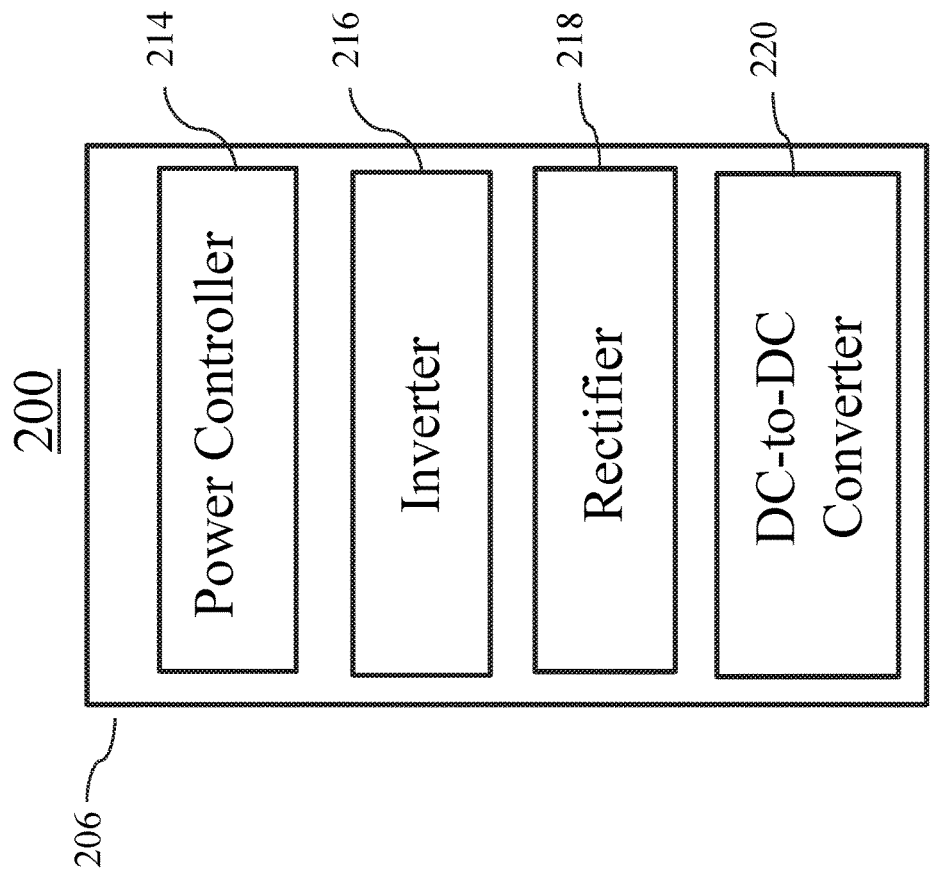
FIG. 2 is a diagram illustrating an example of a power control module 200, according to an embodiment.

FIG. 2 is a diagram illustrating example of a power control module system 200, according to an embodiment. Power control module 206 may comprise power controller 214, inverter 216, rectifier 218, and DC-to-DC converter 220, or any combination thereof. According to an embodiment rectifier 218 may comprise a rectenna, receive for wireless energy, ultrasound power receiver, or any combination thereof—to name a few examples. In an embodiment, power control module 202 may control the distribution of power from power generation sources 104, energy storages 108, and distribution line 112. In an embodiment, power controller 214 may control the flow of the power from power generation sources 104 to energy storages 108, energy storages 108 to distribution line 112 or grid 110, and distribution line 112 to a plurality of loads at a site of sites 102. For example, power controller 214 of power control module 1 106A may control the flow of power from power generation source 1 104A to storage 1 108A. In an embodiment, power controller 214 may comprise a microcontroller unit (MCU), a computer, a mobile device, or any combination thereof—to name a few.

According to an embodiment, power controller 214 may receive a data telegram comprising desired power characteristics and a desired flow for the power generated by a power generation source. For example, power controller 214 may receive a data telegram comprising desired power characteristics for the power generated by power generation source 1 104A such as, as an example, a desired DC current. Further, the data telegram may comprise a desire flow for power generation source 104A, such as distributing the power generated from power generation source 1 104A to storage 1 108A.

In an embodiment, power controller 214 may receive a data telegram comprising desired power characteristics and a desired flow for the power output by an energy storage. For example, power controller 214 may receive a data telegram comprising desired power characteristics for the power generated by storage 1 108A such as, as an example, a desired AC current. Further, the data telegram may comprise a desired power flow for storage 1 108A, such as distributing the power output from storage 1 108A to distribution line 112.

According to an embodiment, power controller 214 may receive a data telegram comprising desired power characteristics and a desired flow for power distributed from distribution line 112 to the plurality of loads at a site of sites 102. For example, power controller 214 may receive a data telegram comprising desired power characteristics for the power distributed from distribution line 112 to a plurality of loads are site 1 102 such as, as an example, a desired DC current.

According to an embodiment, power controller 214 may use inverter 216, rectifier 218, or DC-to-DC converter 220, or any combination thereof, to achieve desired power characteristics for the power generated from power generation sources 10, the power output by energy storages 108, and the power distributed by distribution line 112.

In an embodiment, the plurality of loads located at each site of sites 102 may comprise types of loads that require AC power at certain frequency to operate. Power controller 214 may use inverter 204 to convert AC power from distribution line 112 to AC power at the desired frequency before it is delivered to the loads requiring AC power at that desired frequency. For example, site 3 102C may comprise types of loads that require AC power at 50 Hz to operate. Power controller 214 of power control module 1 106A may convert, via inverter 204, AC power at, for example, 60 Hz distributed from distribution line 112 to AC power at 60 Hz before it is delivered to the plurality of loads at site 3 102C.

According to an embodiment, energy storages 108 may comprise batteries that require DC power at a desired current to charge. Power controller 214 may use DC-to-DC converter 220 to convert DC power output by a power generation source to DC power at a desired current before it is delivered to the batteries. For example, storage 1 108A may comprise batteries that require DC power at a desired current to charge. Power controller 214 of power control module 1 106A may convert, via DC-to-DC converter 220, DC power output by power generation source 1 104A to DC power at a desired current before it is delivered to storage 1 108A.

Figure 3:
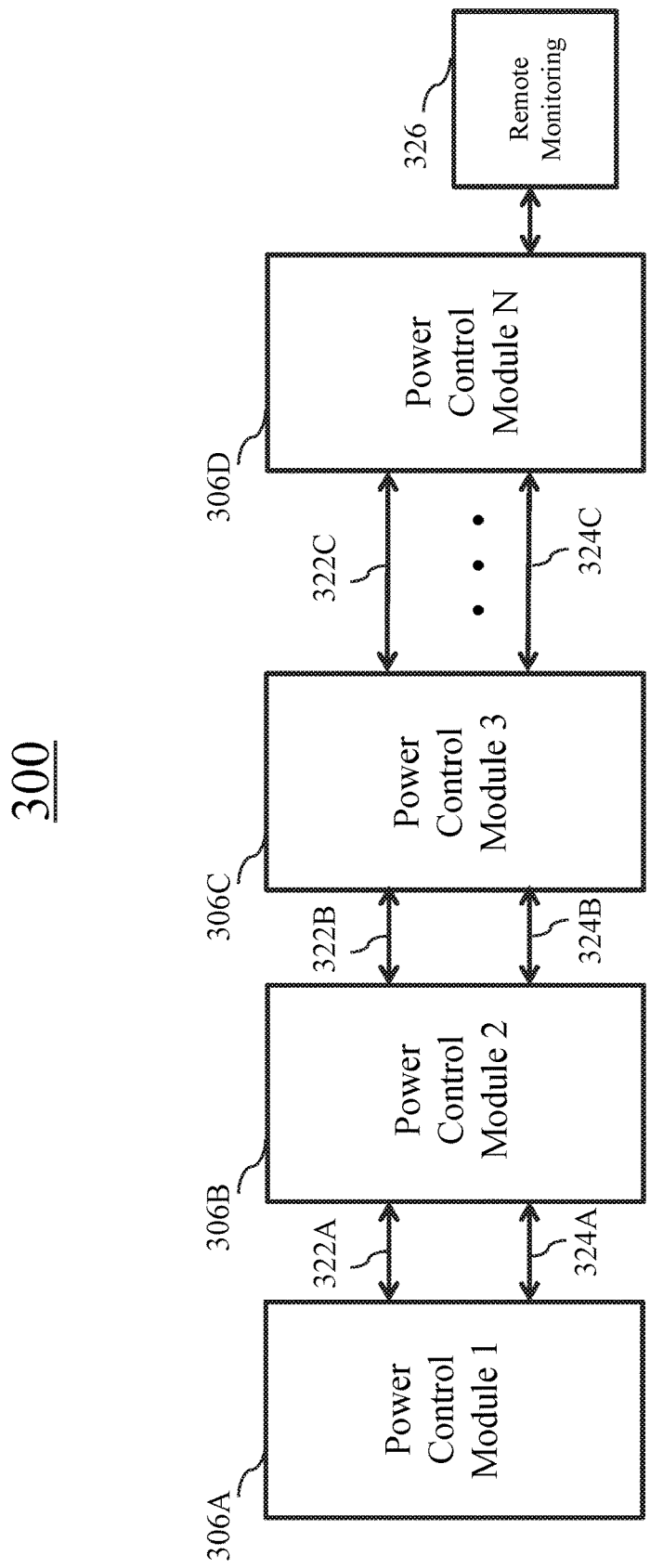
FIG. 3 is a diagram illustrating an example of communications between power control modules 300, according to an embodiment.

FIG. 3 is a diagram illustrating an example of communications between power control modules 300, according to an embodiment. Communication between power control modules 300 may comprise optical bus 322 (comprising optical lines 322A-C) and network bus 324 (comprising network lines 324A-C) between power control modules 306 (comprising power control modules 1 306A, 2 306B, 3 306C, and N 306D).

According to an embodiment, optical bus 322 may connect a number of power control modules from 1 to N. Optical bus 322 may comprise the bi-directional optical lines between the power control modules. For example, optical bus 322 may comprise optical line 322A between power control module 1 306A and power control module 2 306B, optical line 322B between power control module 2 306B and power control module 3 306C, and optical line 322C between power control module 3 306C and power control module N 306D. According to an embodiment, optical lines may comprise optical connections between power control modules, such as, diamond micro interface (DMI) connections, ELIO connections, Lucent (LC) connections, subscriber (SC) connections, or any combination thereof—to name a few examples.

In an embodiment, network bus 324 may connect a number of power control modules from 1 to N. Network bus 324 may comprise the bi-directional network lines between the power control modules. For example, network bus 324 may comprise network line 314A between power control module 1 306A and power control module 2 306B, network line 314B between power control module 2 308B and power control module 3 306C, and network line 314C between power control module 3 306C and power control module N 306D. According to an embodiment, network lines may comprise network connections between the power control modules such as dial-up connections, virtual private network (VPN) connections, wired local area (LAN) connections, wireless LAN connections, direct connections, or any combination thereof—to name a few examples.

According to an embodiment, a power control module may be connected to remote monitoring 326. Remote monitoring 326 may comprise a computer, a handheld device, a smart phone, a MCU, a server, or any combination thereof—to name a few. Remote monitoring 326 may be connected to the power control module via optical bus 322, network bus 324, a wireless connection, internet, Ethernet, or any combination thereof—to name a few examples. For example, remote monitoring 326 may be connected to power control module N 306D via network bus 312.

In an embodiment, remote monitoring may generate a data telegram based upon a received input. The received input may comprise swipes on a screen, received data, strokes on a keyboard, or any combination thereof—to name a few examples. According to an embodiment, the data telegram generated may comprise desired power characteristics and power flow for power generation sources 104, energy storages 108, and distribution line 112 of smart power and storage transfer architecture 100. For example, remote monitoring may generate a data telegram comprising data that energy storages 108 are to supply AC power to distribution line 112 at, as an example, 50A.

In an embodiment, power control modules connected by optical bus 322 and network bus 324 may send data telegrams received by remote monitoring 326 to power control modules they are connected to via optical bus 322 or network bus 324. For example, power control module N 306D may receive a data telegram from remote monitoring 326 comprising telegram comprising data that energy storages 108 are to supply AC power to distribution line 112 at, as an example, 50A. Power control module N 306D may send the data telegram to power control module 3 306C via network line 314C. In turn, power control module 3 306C may send the data telegram to power control module 2 306B via network line 314B.

According to an embodiment, the power control modules may control the power characteristics and flow of power from power generation sources 104, energy storages 108, and distribution line 112 according to the data telegram, as discussed in FIG. 2. In an embodiment, once the power characteristics and flow of power from power generation sources 104 and energy storages 108 has been changed according to the data telegram by a power control module, the power control module may send a response to another power control module or remote monitoring 326 via the optical bus 322 or network bus 324. The response may comprise the power characteristics and flow of power that was altered by the power control module. For example, power control module 3 306C may receive a data telegram from power control module N 306D comprising data that storage 3 108C is to supply AC power to distribution line 112 at, as an example, 50A. Once power control module 3 306C has altered the power characteristics and flow of power from storage 3 108C to supply AC power to distribution line at, for example, 50A, power control module 3

108C may send a response to power control module N 306D, via optical line 322C, comprising data that storage 3 108C is supplying AC power at 50A to distribution line 112.

In an embodiment, the power control modules may forward any received responses to other power control modules or remote monitoring 326 via optical bus 322 or network bus 324. For example, power control module N 306D may receive a response from power control module 3 106 comprising data that storage 3 108C is supplying AC power at, for example, 50A to distribution line 112. In response, power control module N 306D may forward this response to remote monitoring 326 via optical bus 322, network bus 324, a wireless connection, internet, Ethernet, or any combination thereof—to name a few examples.

In an embodiment, the power control modules may detect when a malfunction has occurred at the site the power control module is located at. A malfunction may comprise the malfunction of a power asset at the site, the malfunction of a power storage, a disconnection of a power asset at the site, a loss of communications to a power asset, or any combination thereof—to name a few.

According to an embodiment, the power control modules may report the malfunction to other power control modules or remote monitoring 326 via optical bus 322 or network bus 324. For example, power control module 3 306C, located at site 3 102C, may detect that storage 3 108C has malfunctioned. In response, power control module 3 306C may report this malfunction to power control module N 306D via optical line 322C.

In an embodiment, the power control modules may forward a reported malfunction to other power control modules or remote monitoring 326 via optical bus 213 or network bus 324. For example, power control module N 306D may receive a report of a malfunction from power control module 3 306C. In response, power control module N 306D may forward the reported malfunction to remote monitoring 326 via optical bus 322, network bus 324, a wireless connection, internet, Ethernet, or any combination thereof—to name a few examples.

According to an embodiment, when remote monitoring 326 receives a reported malfunction, a new data telegram may be generated comprising desired power characteristics and power flow for power generation sources 104 and energy storages 108 that compensate for the reported malfunction. For example, remote monitoring 326 may have first sent a data telegram that each of the storages in energy storages 108 is to supply distribution line 112 with AC power at, for example, 50A. Remote monitoring 326 may then receive a reported malfunction comprising data that storage 3 108C has malfunctioned. In response to this reported malfunction, remote monitoring 326 may generate a new data telegram to compensate for this malfunction. As an example, remote monitoring may generate a new data telegram comprising data that each of the storages in energy storages 108 is to supply distribution line 112 with AC power at, for example, 66.7A to compensate for the malfunction of storage 3 108C.

In an embodiment, the power control modules may receive the status of loads located at sites 102 or the status of the environments of sites 102 from the sensors located at sites 102. For example, power control module 1 306A may receive the status of loads at site 1 102 A from the sensors located at site 1 102A. According to an embodiment, the power control modules may send the status of loads at a site to other power control modules or remote monitoring 326 via optical bus 322 or network bus 324.

According to an embodiment, the power control modules may forward the status of loads located at a site or the status of the environment of the site to other power control modules or remote monitoring 326 via optical bus 322 or network bus 324. For example, power control module 3 306C, located at site 3 102C, may receive the status of loads at site 3 102C from the sensors located at site 3 102C. In response, power control module 3 306C may forward the status of the loads at site 3 102C to power control module N 306D via optical line 322C.

According to an embodiment, when remote monitoring 326 receives the status of loads at a site or the status of the environment of the site, a new data telegram may be generated comprising desired power characteristics and power flow for power generation sources 104 and energy storages 108 based on the status of loads at the site or the status of the environment of the site. For example, remote monitoring 326 may receive the status of the loads across sites 102. In response to this status, remote monitoring 326 may generate a new data telegram based on the status of the loads across sites 102. This may include, as a few examples, lowering the power supplied to distribution line 112, increasing the power supplied to distribution line 112, converting the power supplied to the loads at a site of sites 102, or any combination thereof.

As a further example, remote monitoring 326 may receive the status the environment at site 2 102B. In response to this status, remote monitoring 326 may generate a new data telegram based on the status of the environment. This may include, as a few examples, back-feeding power output from energy storages 108 to grid 110, feeding power output from energy storages 108 to distribution line 112, providing power from a power generation source to a storage of energy storages 108, or any combination thereof.

Figure 4:
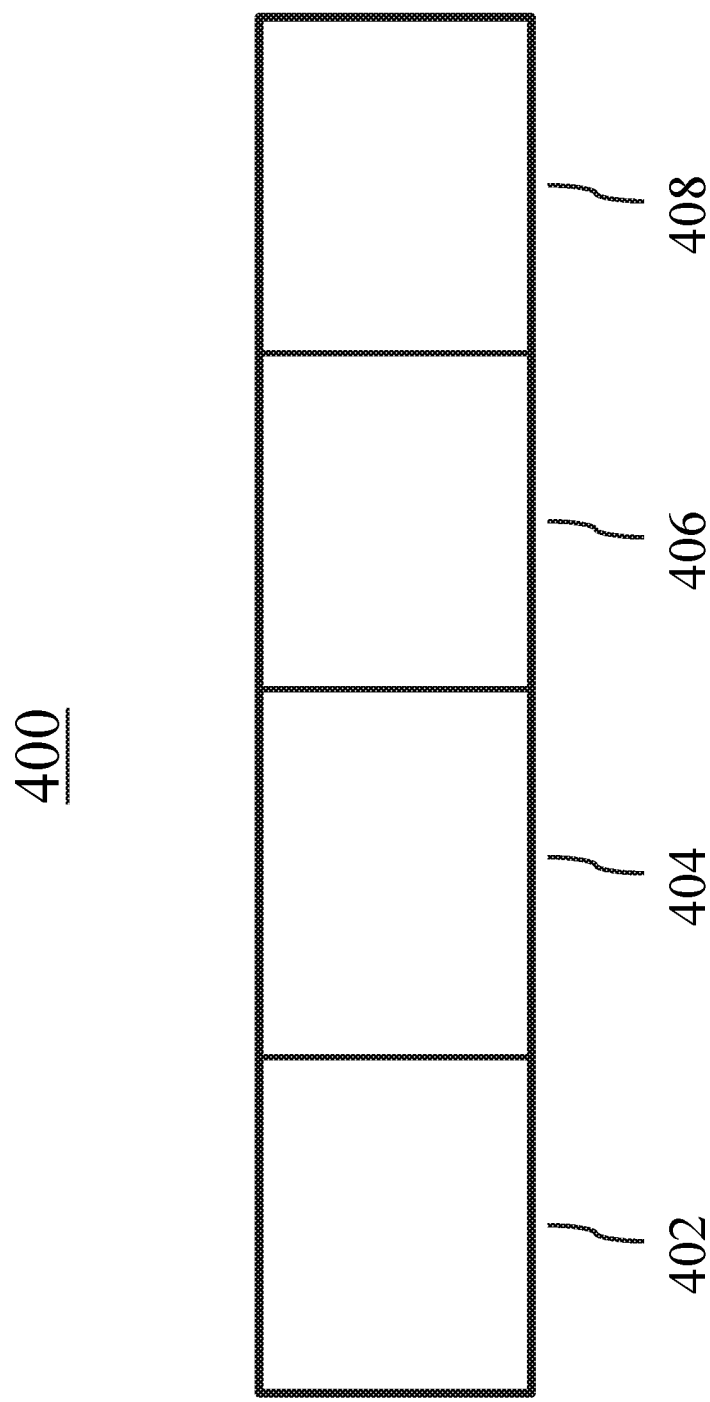
FIG. 4 is a diagram illustrating data telegram 400, according to an embodiment.

FIG. 4 is a diagram illustrating data telegram 400, according to an embodiment. In an embodiment, data telegram 400 may comprise blocks 402, 404, 406, and 408. Block 402 may comprise synchronization bits, or a synchword. Synchronization bits may comprise data indicating the end of header information and the beginning the data, or frame, of the data telegram 400.

According to an embodiment, block 404 may comprise object type bytes. Object type bytes may comprise data indicating the storage of energy storages 108 for which the data telegram is intended. For example, remote monitoring 326 may send data telegram 400 instructing storage 3 108C to output, for example, 10A of AC power to distribution line 112. In this case, block 404 of data telegram 400 may comprise object type bytes comprising data indicating the data telegram is meant for storage 3 108C.

In an embodiment, block 406 may comprise data bytes. Data bytes may comprise data indicating commands to power control modules. These commands may comprise changes to power characteristics, request for responses, activation/deactivation requests, or any combination thereof—to name a few. For example, remote monitoring 326 may send data telegram 400 instructing storage 3 108C to output, for example, 10A of AC power to distribution line 112. In this case, block 406 of data telegram 400 may comprise data bytes comprising data indicating to change power characteristic to control the power output of storage 3 108C to output, for example, 10A of AC power to distribution line 112.

According to an embodiment, block 408 may comprise a number of objects for which an answer is requested. The answer requested may be status information, power profile information, connection information, or any combination thereof—to name a few. For example, remote monitoring 326 may send a data telegram 400 storage 3 108C to output, for example, 10A of AC power to distribution line 112 and storage 3 108C is to respond. In this case, block 408 may comprise information indicating that one storage is to respond with an answer with status information.

Figure 5:
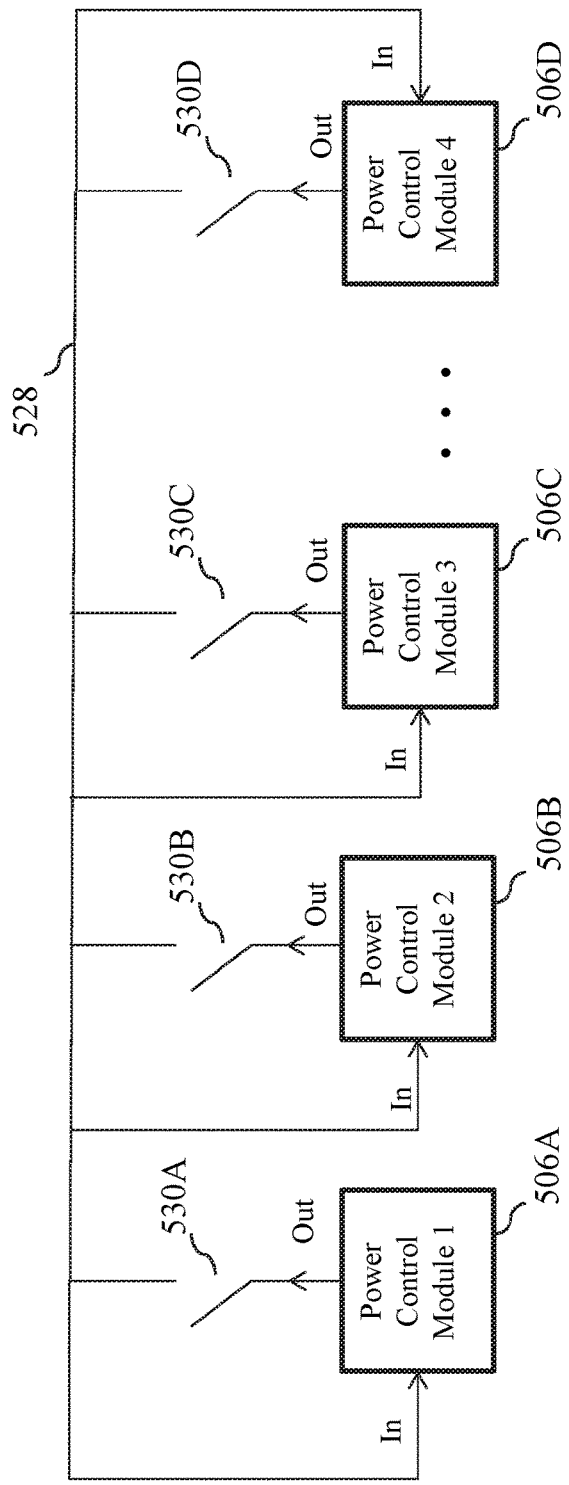
FIG. 5 is a diagram illustrating an example of generation of a synchro signal, according to an embodiment.

FIG. 5 is a diagram illustrating an example of generation of a synchro signal 500, according to an embodiment.

According to an embodiment, generation of a synchro signal 500 may comprise synchro line 528, power control modules 506 (comprising power control module 1 506A, power control module 2 506B, power control module 3 506C, and power control module N 506D), and switches 530 (comprising switch 1 530A, switch 2 530B, switch 3 530C, and switch N 530D). In an embodiment, generation of a synchro signal 500 may have any number of power control modules 506, for example, from 1 to N.

In an embodiment, each power control module 506 may have an input connection and an output connection to synchro line 528. Synchro line 528 may comprise a wired connection (e.g., fiber connection, Ethernet connection, dedicated bus system, or any combination thereof), a wireless connection (e.g., WIMAX, WIFI, GSM, CDMS, or any combination thereof, or any combination thereof—to name a few examples. According to an embodiment, the output of each power control module to synchro line 528 may be fed through a respective switch 530. For example, the output to the synchro line from power control module 1 506A may be connected to switch 1 530A, wherein switch 1 530A is connected to synchro line 528.

According to an embodiment, each power control module 506 may generate a synchro signal. The synchro signal may encompass data instructing power control modules 506 to generate AC power at a specific frequency, such as, for example, from an inverter of the power control module 506. For example, power control module 1 506A may generate a synchro signal comprising data instructing each power control module of power control modules 506 to generate AC power at a frequency of 60 Hz.

In an embodiment, synchro line 528 may be used to provide a synchro signal generated from one of the power control modules 506 to each other power control module 506. For example, power control module 1 506A may generate a synchro signal comprising data instructing each power control module 504 to generate AC power at a frequency of, for example, 60 Hz. The synchro signal may be provided to synchro line 528 via the output of power control module 1 506A. The synchro signal may then be carried by synchro line 528 to the inputs of the other power control modules 506 (power control module 2 506B, power control module 3 506C, and power control module N, 504N).

According to an embodiment, switches 530 may control the respective output of each power control module to synchro line 528. For example switch 1 530A may control the output of power control module 1 506A to synchro line 528, switch 2 530B may control the output of power control module 2 506B to synchro line 528, switch 3 530C may control the output of power control module 504C to synchro line 528, and switch N 530D may control the output of power control module N 506D to synchro line 528. Having switches 530 control the outputs of the respective power control module prevents multiple synchro signals being carried by synchro line 528. In an embodiment, only one switch 530 is closed at a time. For example, switch 1 530A may be closed while switch 2 530B, 3 506C, and N 506D are open. This may allow for only a single synchro signal to be received by power control modules 506, causing each power control module 506 to generate AC power at the same frequency—i.e., be synchronized in their generation of AC power.

According to an embodiment, power control modules 506 may toggle a respective switch when a synchro signal is generated. For example, when power control module 2 506B generates a synchro signal, power control module 2 506B may toggle switch 2 530B from open to closed. In an embodiment, power control modules 506 may be configured so that only one switch is toggled closed at a time. This configuration may encompass an ordering in which power control modules 506 toggle switches, each power control module 506 only closing a respective switch after it has detected an absence on synchro line 528 for a respective time period, power control modules 506 reporting to one another that a synchro signal is being generated, or any combination thereof—to name a few examples.

For example, the configuration may include power control modules 506 reporting to each other that a synchro signal has been generated and as well as a priority order for synchro signal generation. The priority order may, for example, comprise power control module 1 506A having first priority to generate a synchro signal, then power control module 2 506B, then power control module 3 506C, and then power control module N 506D. According to this configuration, power control module 2 506B may not generate a synchro signal and close its respective switch until it detects that power control module 1 506A no longer reports it is generating a synchro signal, power control module 3 506C may not generate a synchro signal and close its respective switch until it detects that power control module 1 506A and power control module 2 506B are no longer report generating a synchro signal, and power control module N 506D may not generate a synchro signal and close its respective switch until it detects that power control module 1 506A, power control module 2 506B, and power control module 3 506C are no longer report generating a synchro signal.

In an embodiment, each power control module 506 may periodically check for the presence of a sychro signal on synchro line 528. The period that each power control module checks for a synchro signal may be a specific time in microseconds, milliseconds, seconds, minutes, hours, or any combination thereof—to name a few examples. For example, power module 2 506B may check for a synchro signal on synchro line 528 every 5 milliseconds.

According to an embodiment, if a power control module 506 determines that there is no synchro signal on synchro line 528—because, for example, the power control module 506 supplying the synchro signal has malfunctioned—the power control module 506 that detected the absence may generate a new synchro signal. For example, power control module 2 506B may detect that there is no synchro signal on synchro line 528. In response to this detection, power control module 506B may generate a new synchro signal. In an embodiment, a power control module 506 may generate a new synchro signal based on the last received synchro signal. The new synchro signal may match the frequency of the last received synchro signal, have a frequency based upon the duration of the detected absence of the last received synchro signal, have a frequency determined by adding a constant value to the frequency of the last received synchro signal, or any combination thereof—to name a few examples. As an example, power control module 1 506A may be generating and supplying a synchro signal to synchro line 528 when power control module 1 506A malfunctions. Power control module 2 506B may then detect that there is no longer a synchro signal on synchro line 528 as power control module A 504 has malfunctioned. Power control module B 504B may further generate and supply a synchro signal to synchro line 528 matching the frequency of the last received synchro signal from power control module 1 506A before it malfunctioned.

Power control modules 506 generating new synchro signals when no synchro signal is detected on synchro line 528, allows for redundancy in the system. For example, if a power control module 506 generating and supplying the synchro system is to malfunction, having another power control module 506 that may generate and supply a new synchro signal allows the system to compensate for any hardware, network, connection—any combination thereof—failures that would interfere with the synchronization of AC power generated by power control modules 506.

In an embodiment, when a power control module generates a new synchro signal to supply to synchro line 528, its respective switch 530 connected to the output of the power control module may close. For example, after detecting there is not a synchro signal on synchro line 528, power control module 2 506B may generate a new synchro signal. Power control module 2 506B may further close switch 2 530B to allow the newly generated synchro signal to be supplied to synchro line 528.

According to an embodiment, each power control module 506 may generate a new synchro signal after detecting the absence of a synchro signal on synchro line 528 for a time period respective to each power control module 506. By having each power control module 506 generate a signal generate a new synchro signal only after detecting an absence of a signal for a respective time period, the generation of synchro signals by power control modules 506 is staggered to prevent the multiple synchro signals on synchro line 528. For example, power control module 2 506B may generate a new synchro signal after detecting an absence of a signal for about 1 millisecond, for example, power control module 3 506C after about 4 milliseconds, for example, and power control module N 506D after about 7 milliseconds, for example.

Figure 6:
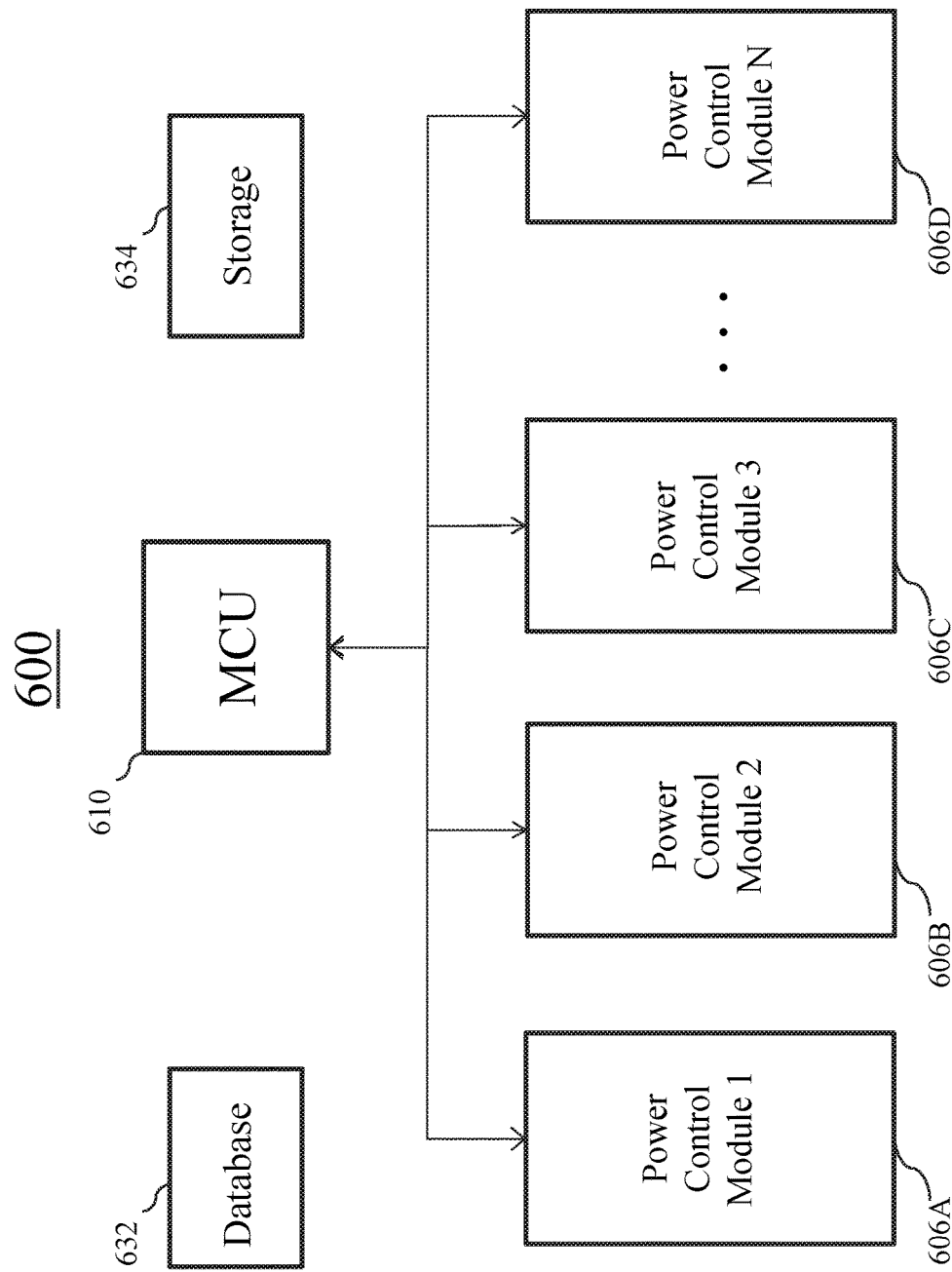
FIG. 6 is a diagram illustrating an example of system 600 for power adaptive learning, according to an embodiment.

FIG. 6 is a diagram illustrating an example of system 600 for power adaptive learning, according to an embodiment.

According to an embodiment, power adaptive learning 600 may comprise MCU 610, database 632, memory 634, and power control modules 606 (which may include, for example, power control module 1 606A, power control module 2 606B, power control module 3 606C, and power control module N 606N).

According to an embodiment, each power control module of power control modules 606 may send asset data related to assets connected to power control modules 606 and sensor data from power control modules 606 to MCU 610. For example, power control module 1 606A, located at site 1, may send asset and sensor data from location 1, to MCU 610. The sent asset and sensor data may comprise data relating to the assets located at a site, the environment of the site, or any combination of the two. Sensor data relating to the assets located at the site may comprise peak loads, off-load periods, battery levels, battery usage, depth of discharge, or any combination thereof—to name a few examples. Sensor and asset data relating to the environment of the site may comprise the temperature, humidity, solar irradiation, precipitation—or any combination thereof—of a site. For example, sensor data sent from power control module 1 606A, located at site 1, may comprise the voltage and current use of the loads at site 1 as well as the temperature and solar irradiation of site 1. In an embodiment, power control modules 606 may further send asset and sensor data to MCU 610 with related timestamps. For example, power control module 1 606A, located at site 1, may send data comprising the battery levels of the batteries at site 1. Power control module 1 608 may further send a timestamp comprising when the battery levels were determined.

According to an embodiment, MCU 610 may receive data relating to a grid connected to the system, such as grid 110, as well as the respective timestamps for the data from power control modules 606. Data relating to the grid may comprise grid events, power outages, timestamps, or any combination thereof—to name a few examples.

In an embodiment, MCU 610 may request and receive data from database 632. Database 632 may comprise an online data base, a local database, an information service, an alert service, or any combination thereof. Database 632 and MCU 610 may be connected via a wired connection (e.g., fiber connection, Ethernet connection, dedicated bus system, or any combination thereof), a wireless connection (e.g., WIMAX, WIFI, GSM, CDMS, or any combination thereof—to name a few examples. According to an embodiment, the data requested and received from database 632 may comprise weather information, environmental information, usage information, grid information, or any combination thereof—to name a few examples related to the sites at which power control modules 606 are located. For example, MCU 610 may request and receive temperature and humidity information relating to site 1, at which power control module 1 606A is located. In an embodiment, after MCU 610 has received data from database 632, it may store the received data in memory 634.

In an embodiment, database 632 may send information to MCU 610 based upon a subscription, historic usage, alert system, or any combination thereof—to name a few examples.

According to an embodiment, data and timestamps received by MCU 610 may be stored in memory 634. Memory 634 may comprise random access memory (RAM), read-only memory (ROM), electronically erasable programmable random access memory (EEPROM), hard disk drive (HDD), solid state drive (SSD), or any combination thereof—to name a few examples. In an embodiment, data and timestamps stored in memory 634 may be recalled and delivered to MCU 610.

In an embodiment, MCU 610 may construct a data telegram according to data and timestamps received from database 632, memory 634, power control modules 606, or any combination thereof. According to an embodiment, the data telegram may be constructed to adapt power supplied by power control modules 606 according to the data received by MCU 610, as discussed in FIG. 7.

Figure 7:
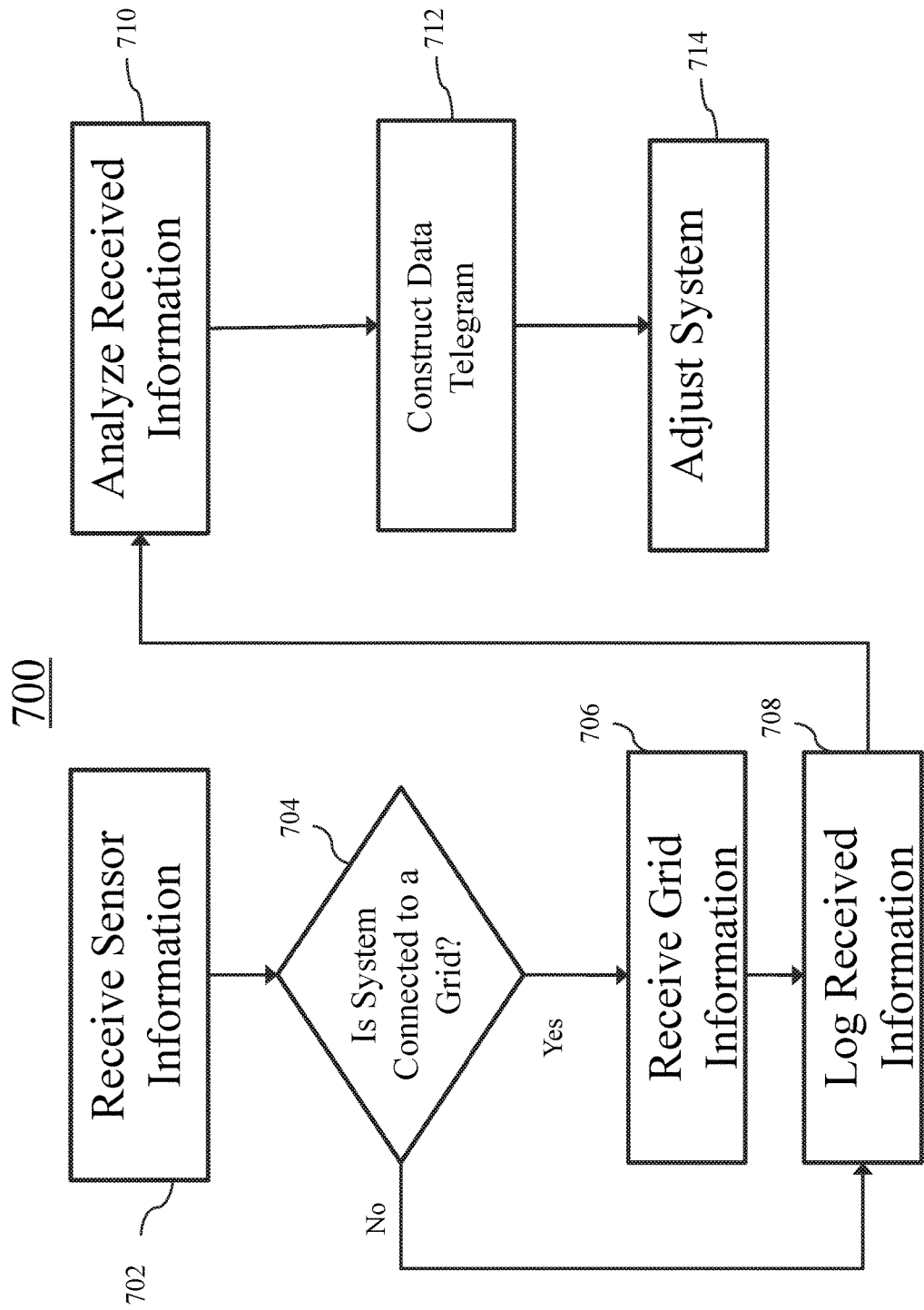
FIG. 7 is a flowchart illustrating a process for power adaptive learning, according to an embodiment.

FIG. 7 is a flowchart illustrating a process for power adaptive learning, according to an embodiment.

At 702, MCU 610 may receive asset information, sensor information, and timestamps from power control modules 606, as discussed in FIG. 6. For example, MCU 610 may receive data comprising the battery levels at site 1, load usage at site 1, and the corresponding timestamps for this data from power control module 1 606A. According to an embodiment, MCU 610 may only request and receive data from power control modules 606 periodically. For example, MCU 610 may request and receive data from power control modules 606 every hour, day, week, month, or any combination thereof—to name a few examples.

At 704, MCU 610 may determine if the system is connected to a grid. According to an embodiment, MCU 610 may determine if the system is connected to a grid based upon data received from power control modules 606. For example, power control module 2 606B may be connected to a grid and may send data to MCU 610 indicating that a grid is connected to the system. If MCU 610 determines that the system is connected to a grid, then the system may move to 706, otherwise the system may move to 708.

At 706, MCU 610 may receive data relating to the grid from power control modules 606. Data relating to the grid may comprise grid events, power outages, timestamps, or any combination thereof—to name a few examples. At 708, MCU 610 may store all data received from power control modules 606 in memory 634. For example, MCU 610 may receive data comprising battery levels load usage, grid power outages, and the related timestamps for this data. MCU may then store the data and related timestamps in memory 634.

At 710, MCU 610 may analyze data stored in memory 634 to adapt the power supplied by power control modules 606. The data analyzed may comprise stored data from database 632 and power control modules 606. The data analysis may comprise determining a historic usage of loads based on the stored data, predictions for grid power outages based on the stored data, peak load times based on the stored data, battery discharge rates based on the stored data, predicted weather, or any combination thereof—to name a few examples. According to an embodiment, MCU 610 may analyze data that has been collected over a period of time. For example, MCU 610 may analyze data collected and stored over a specific number of days, weeks, months, years, or any combination thereof. Allowing MCU 610 to analyze data over specific timeframes allows the data analysis more data, and thus more data points, in determining historic usages and predictions.

As an exemplary non-limiting embodiment, MCU 610 may analyze stored data comprising grid power outages over a 30-day period. The analysis may comprise determining a prediction of when grid power outages are to occur. For example, based on the stored data, MCU 610 may determine that there is a grid power outage every day, for example, from the hours of 7:00 PM to 9:00 PM.

As a further exemplary non-limiting embodiment, MCU 610 may analyze stored data comprising load usage over a 30-day period. The analysis may comprise determining a prediction that the loads are at their peak usage, for example, from the hours of 5:00 PM to 7:00 PM.

As another exemplary non-limiting embodiment, MCU may analyze stored data comprising a weather forecast. The weather forecast may, for example, comprise data identifying that it to rain. The analysis may determine a prediction for the loss of generated power—such as by solar panels, as an example—due to the weather forecast.

At 712, MCU 610 may construct a data telegram based upon the data analysis. In an embodiment, based on the historic usages and predictions determined by MCU 610, MCU 610 may construct a data telegram to adapt the system to the determined historic usages and predictions. By constructing a data telegram to adapt the system to the determined historic usages and predictions, the system may improve efficiency and performance. For example, based on the data stored in memory 634, MCU 610 may determine a prediction that there is a grid power outage, for example, every day from 7:00 PM to 9:00 PM. Based on this prediction, MCU 610 may construct a data telegram instructing power control modules 606 to increase the power supplied to distribution line 112 to compensate for the grid power outage.

At 714, MCU 610 may send the constructed data telegram to power control modules 606. In response, power control modules 606 may alter power characteristics according to the constructed telegram. According to an embodiment, MCU 610 may send the constructed data telegram when an event is predicted to occur based on the data analysis by MCU 610. For example, MCU 610 may determine a prediction that there is a grid power outage, for example, every day from 7:00 PM to 9:00 PM. Based on this prediction, MCU 610 may send the constructed data telegram when the grid power outage is predicted to occur—for example, from 7:00 PM to 9:00 PM.

Figure 8:
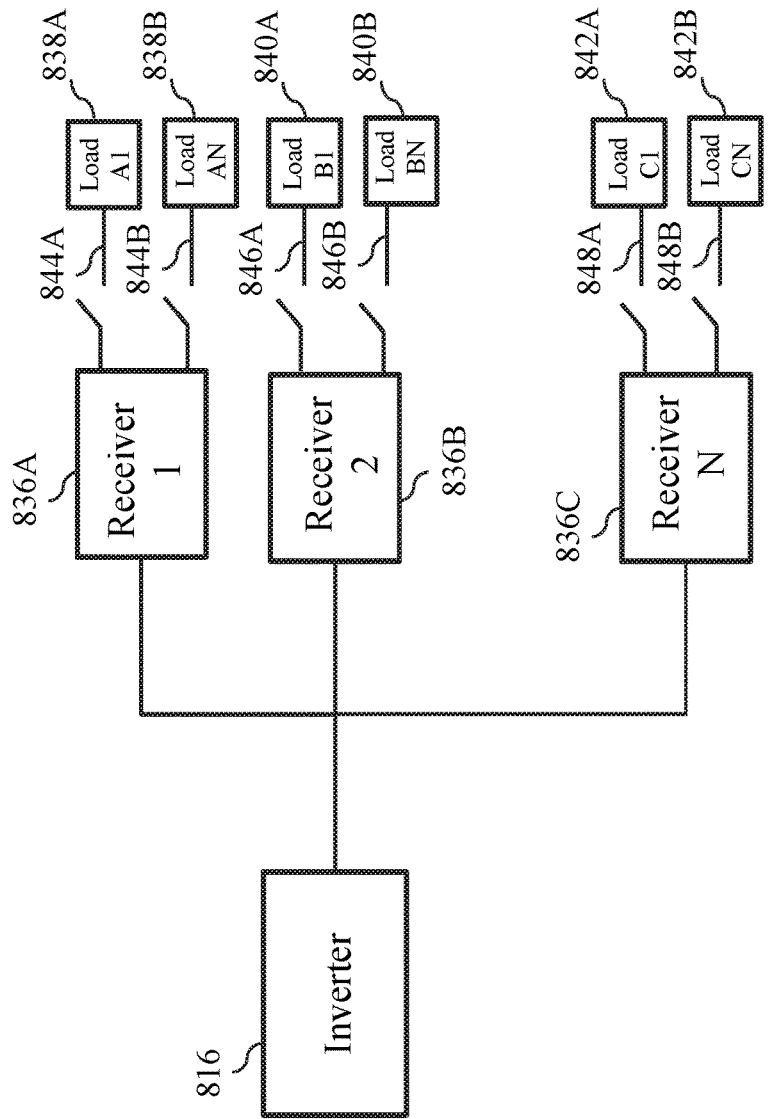
FIG. 8 is a diagram illustrating an example of system 800 for load switching, according to an embodiment.

FIG. 8 is a diagram illustrating an example of a system 700 for frequency controlled load switching, according to an embodiment.

According to an embodiment, system 700 for frequency controlled load switch may include one or more inverters 816, receivers 836 (comprising, for example, receiver 1 836A, receiver 2 836B, receiver N 836C, or any combination thereof), loads A (comprising, for example, load A1 838A and load AN 838B), loads B (comprising, for example, load B1 840A and load BN 840B), loads C (comprising, for example, load C1 842A and load CN 842B), load switches A (comprising, for example, load switch A1 844A and load switch AN 844B), load switches B (comprising, for example, load switch B1 846A and load switch BN 846B), and load switches C (comprising, for example, load switch C1 848A and load switch CN 848B).

In an embodiment, receivers 836 may comprise any number of receivers, for example, from 1 to N receivers. Receivers 836 may encompass power control units, MCUs, processors, microprocessors, or any combination thereof—to name a few examples. According to an embodiment, each receiver 836 may be located at a different site, such as, for example, sites 102. Each receiver 836 may be connected to a plurality of loads at its respective site. For example, receiver 1 836A may be connected to loads A 838 (located at site 1 102A), receiver 2 836B may be connected to loads B 840 (located at site 2 102B), and receiver N 836C may be connected to loads C 842. In an embodiment, loads A 838, loads B 840, and loads C 842 may each comprise any number of loads, for example, from 1 to N loads. Loads A 838, loads B 840, and loads C 842 may include a plurality of load types, as discussed in FIG. 1.

According to an embodiment, as discussed in FIG. 1, distribution line 112 may be connected to the loads across sites 102 and power may be delivered to the loads via distribution line 112. According to another embodiment, distribution line 112 may be connected to receivers 836 and power may be delivered to receivers 836 via distribution line 112. Receivers 836 may forward the power received from distribution line 112 to their respective, connected loads. For example, receiver 1 836A may forward power received from distribution line 112 to loads A 844. According to an embodiment, each load at a site may be connected to its respective receiver 836 by a switch. For example, loads A 838 may be connected to receiver 1 836A via switches A 844—i.e., load A1 may be connected to receiver 1 836A by switch A1 844A and load AN may be connected to receiver 1 836A by switch AN 844B. In an embodiment, switches A 844, switches B 846, and switches C 848 may normally be an open state, a closed state, or any combination thereof.

In an embodiment, as discussed in FIG. 5, power control modules 506 may generate a synchro signal that controls the frequency of the AC power supplied by the invertors of power control modules 506. For example, power control modules 506 may generate a synchro signal that controls the frequency of the power supplied by inverter 816 to receivers 836. According to an embodiment power control modules 506 may generate a synchro signal causing the frequency of the AC power supplied by inverter 816 to increase or decrease based upon environmental conditions (for example, solar irradiation, temperature, humidity, or any combination thereof), status of power generation sources (for example, solar input energy, fuel levels, charge states, or any combination thereof), status of energy storages (for example, energy levels, charge states, connectivity, or any combination thereof), grid status (for example, output levels, connectivity, or any combination thereof), timing (for example, certain days, certain weeks, time of day, or any combination thereof), or any combination thereof. According to an embodiment, power control modules 506 may receive environmental conditions, status of power generation sources, status of energy storages, grid status, timing—or any combination thereof—from sensors 102 (as discussed in FIG. 1), database 632 (as discussed in FIG. 6), or any combination thereof.

Figure 9:
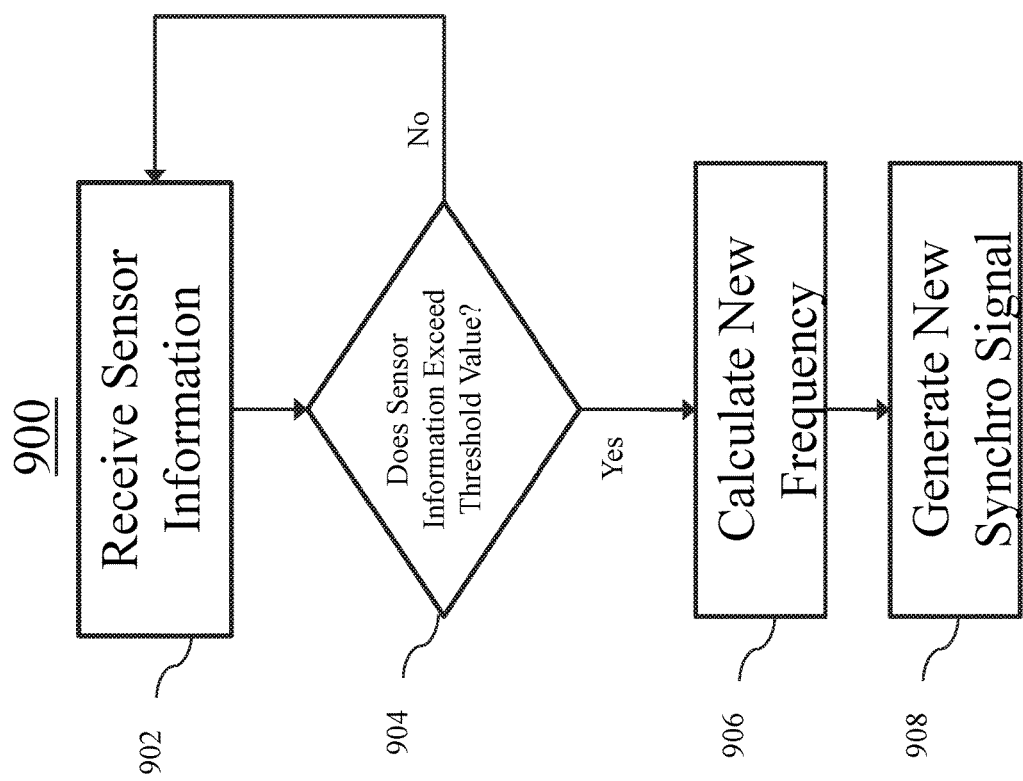
FIG. 9 is a flowchart illustrating a process for generating a synchro signal based upon received data, according to an embodiment.

FIG. 9 is a flowchart illustrating a process for generating a synchro signal based upon received data, according to an embodiment.

At 902, power control modules 506 may receive data from sensors 102, database 632, or any combination thereof—as discussed in FIG. 8. At 904, power control modules 506 may determine whether the received data exceeds a threshold value. According to an embodiment, the threshold value may be a desired condition for power generation, (for example, desired solar irradiation, time of day, temperature, or any combination thereof), desired status of a power generation source (for example, desired power output characteristics, fuel levels, solar input energy, or any combination thereof), status of a grid, or any combination thereof—to name a few examples. If the received data does exceed a threshold value, then the system may move to 906, otherwise 902 may be repeated. For example, power control modules 506 may receive data indicating that the average solar irradiation across all sites is, as an example, 0.4 kW/m$^2$. Assume the threshold value is, for example, 0.2 kW/m$^2$. Power control modules 506 may then compare the received solar irradiance average of 0.4 kW/m$^2$ to the threshold value of 0.2 kW/m$^2$ and determine that the received solar irradiance average exceeds the threshold value. Because the received solar irradiance average exceeded the threshold value, the system may move on to 906.

According to another embodiment, at 904, power control modules 506 may determine that the received data falls below a threshold value. If the received data falls below a threshold value, then the system may move to 906, other 902 is repeated.

At 906, power control modules 506 may calculate a new frequency for the AC power supplied by inverter 816. According to an embodiment, the new frequency may be calculated based upon the degree by which the received information exceeded, or fell below the threshold value, a set value, a comparison of the received information to another threshold value, or any combination thereof. For example, AC power may be generated at, as an example, 50 Hz when power control modules 506 receive data indication that the average solar irradiation across all sites is, as an example, 0.2 kW/m$^2$. Assume the threshold value is, as an example, 0.4 kW/m$^2$. Power control modules 506 may further determine that because the threshold value was exceeded by 0.2 kW/m$^2$, the frequency of the AC power supplied by inverter 816 should be increased by, for example, 0.2—i.e., a new frequency of 50.2 Hz.

At 908, power control modules 506 may generate a new synchro signal, as discussed in FIG. 5, causing inverter 816 to generate AC power at the calculated new frequency determined at 906.

Figure 10:
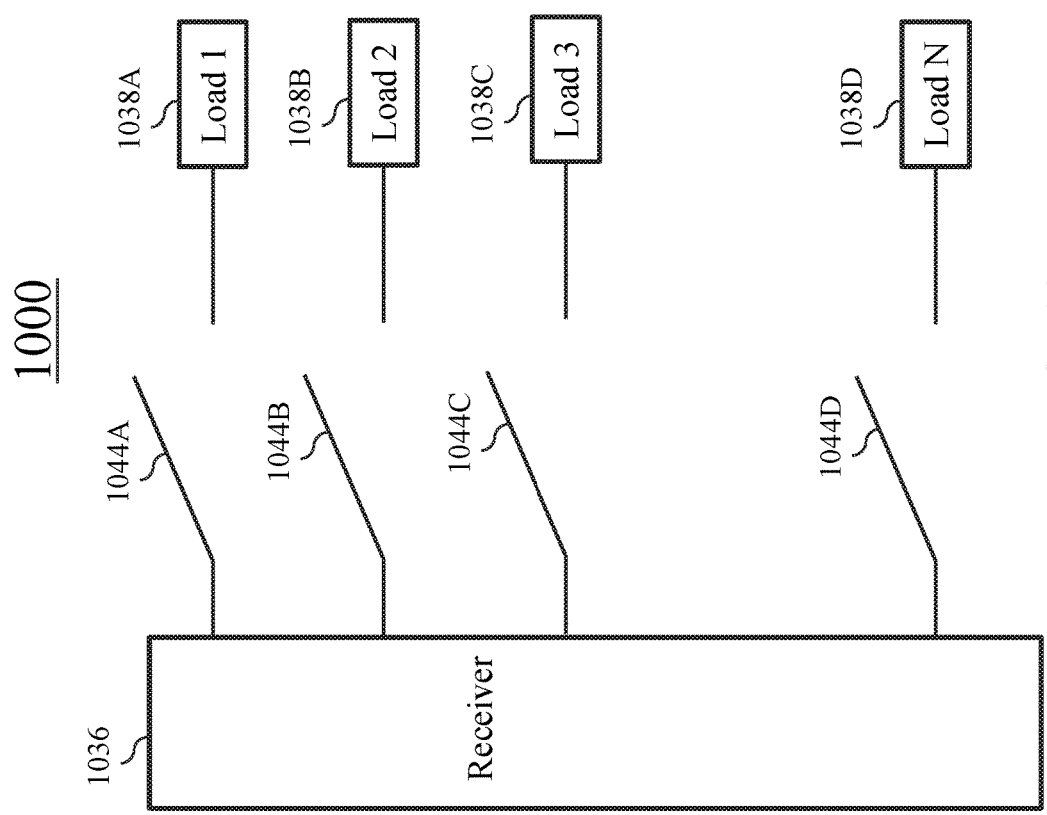
FIG. 10 is a diagram illustrating an example of a system 1000 for frequency controlled load switching, according to an embodiment.

FIG. 10 is a diagram illustrating an example of a system 1000 for frequency controlled load switching, according to an embodiment.

According to an embodiment, a system 1000 for frequency controlled load switching may include one or more receivers 1036, load switches 1044 (comprising, for example, load switch 1 1044A, load switch 2 1044B, load switch 3 1044C, load switch N 1044D, or any combination thereof), and loads 1038 (comprising, for example, load 1 1038A, load 2 1038B, load 3 1038C, load N 1038D, or any combination of.

As discussed in FIG. 8, receiver 1036 may be connected to each load 1038 by a respective load switch 1044. For example, receiver 1036 may be connected to load 1 1038A via load switch 1 1038A. In an embodiment, receiver 1036 may be connected to any number of loads (for example from 1 to N) any number of respective load switches 1044 (for example from 1 to N). According to an embodiment, load switches 1044 may normally be open, closed, or any combination thereof.

As discussed in FIG. 8, receiver 1036 may receive power delivered by distribution line 112 and may forward the delivered power to loads 1038. In an embodiment, receiver 1036 may measure the frequency of the power delivered by distribution line 112. Receiver 1036 may measure the frequency through the comparison of timers, the use of a multimeter, phase measurement, or any combination thereof—to name a few examples. According to an embodiment, receiver 1038 may open and close load switches 1044 based upon the measured frequency.

In an embodiment, receiver 1036 may assign a frequency value to each load switch 1044 that it is connected to. The frequency assigned to each load switch 1044 may be within a set range. For example, receiver 1036 may assign a frequency to each load switch 1044 that is connected wherein the frequencies are with the range of, for example, 50-51 Hz. According to an embodiment, receiver 1036 will toggle a switch when the frequency of the power delivered by distribution line 112 exceeds a load switch's 1044 assigned frequency value, is below a load switch's 1044 assigned frequency value, is equivalent to a load switch's 1044 assigned frequency value, or any combination thereof. As an example, receiver 1036 may assign a frequency value of, for example, 50.1 Hz, to load switch 1 1044A, 50.2 Hz to load switch 2 1044B, 50.3 Hz to load switch 3 1044C, and 50.4 Hz to load switch N 1044D. Assume that receiver 1038 has measured a frequency of 50.2 Hz from distribution line 112. Receiver 1038 may then determine that the read frequency of 50.2 Hz meets or exceeds the assigned frequency values of load switch 1 1044A and load switch 2 1044B and toggle these switches.

According to an embodiment, receiver 1036 may assign frequency values to each load switch 1044 based upon the load 1038 connected to the respective load switch 1044. Assigning frequency values based upon the connected load 1038 may comprise assigning frequency values to load switches 1044 based upon the power consumption, power needs, connectivity—or any combination thereof—of the respective loads 1038 connected to the load switches 1044. For example, load switches 1044 connected to loads 1038 that have higher power needs may have frequency values assigned that are the frequencies generated by power control units 508 when power control units 508 detect that there is a loss in power generation (from, for example, low solar irradiance, grid failure, low fuel, or any combination thereof). Assigning the frequency values in this way would switch off the loads with high power needs when power generation lessens.

In an embodiment, a priority may be assigned to each load 1038. The priority may encompass values indicating the importance of a load, the sensitivities of a load, the need for the load, or any combination thereof—to name a few examples. Receiver 1036 may assign frequency values to switches 1044 based upon the priority assigned to the respective load 1038 connected to a switch 1044. As an exemplary embodiment, receiver 1036 may assign frequency values based on priority by assigning frequency values that occur on distribution line 122 when power generation is high (from, for example, high solar irradiance, grid connectivity, high charge in energy storages, or any combination thereof) to switches 1044 connected to load 1038 assigned with a low priority, and assigning frequency values that fall below frequencies that occur on distribution line 122 when power generation is low (from, for example, low solar irradiance, grid failure, low fuel, or any combination thereof). Thus, when power generation is high, load switches 1044 connected to loads 1038 with low priority are closed, but once the power generation lessens, load switches 1044 connected to loads 1038 with low priority are open while load switches 1044 connected to loads 1038 with high priority are closed.

While the above an exemplary embodiment details opening switches that are naturally closed depending on the frequency of the power supplied by distribution line 112, it should be understood that the disclosure is not limited thereto. Other embodiments and modifications thereto are possible, and are within the scope and spirit of this disclosure. For example, closing switches that are naturally open depending on the frequency of the power supplied, and a mixture of the two are also possible.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A stored power transfer control system comprising:
   a remote monitoring processor located remotely from a plurality of sites, wherein the plurality of sites are connected to a distribution line;
   a plurality of energy storage systems distributed across the plurality of sites; and
   a plurality of power control modules distributed across a plurality of sites, at least one of the plurality of power control modules configured to:
   receive, by a first communication bus, a data telegram from a monitoring processor,
   forward, by the first communication bus, the data telegram to a connected power control module, and
   supply the distribution line with power output by a respective energy storage system according to the data telegram.

2. The system of claim 1, wherein the monitoring processor is configured to generate the data telegram based on desired power characteristics for the plurality of energy storage systems.

3. The system of claim 1, the plurality of power control modules further configured to:
   synchronize power from the plurality of energy storage systems at a common frequency.

4. The system of claim 1, wherein the distribution line is configured to:
   supply power from the plurality of energy storage systems to each of the plurality of sites.

5. The system of claim 1, the plurality of power control modules further configured to:
   detect a malfunction of the respective energy storage system located at the same site.

6. The system of claim 5, the plurality of power control modules further configured to:
   report the malfunction of the respective energy storage system located at the same site to the monitoring processor.

7. The system of claim 6, wherein the monitoring processor is configured to generate a second data telegram in response to the reported malfunction.

8. In a distributed stored power transfer control system, a system comprising:
   a memory located at a site; and
   at least one processor located at the site coupled to the memory and configured to:
   receive a first synchro signal from a synchro line, wherein the first synchro signal comprises a desired frequency for a power output;

detect that the first synchro signal is present on the synchro line;

generate a second synchro signal when the first synchro signal is not detected on the synchro line, wherein the second synchro signal is based upon the first synchro signal; and supply the second synchro signal to the synchro line.

9. The system of claim 8, the at least one processor further configured to:

invert the power output at the desired frequency.

10. The system of claim 8, wherein the second synchro signal comprises the desired frequency for a power output.

11. The system of claim 8, wherein the at least one processor is connected to the synchro line via an input and an output connection.

12. The system of claim 11, wherein the output connection is further connected to a switch.

13. The system of claim 12, wherein the at least one processor configured to generate is further configured to:

close the switch connected to the output connection.

14. The system of claim 8, wherein the first synchro signal is generated at a second site.

\* \* \* \* \*